Patented Nov. 2, 1943

UNITED STATES PATENT OFFICE 2,333,368

HYDRATION OF PHTHALIC ANHYDRIDE

Edwin Austin Gaskill, Jr., Philadelphia, Pa., assignor, by mesne assignments, to Allied Chemical & Dye Corporation, a corporation of New York No Drawing. Application June 14, 1940,
Serial No. 340,566

10 Claims. (Cl. 260—515)

This invention relates to the hydration of phthalic anhydride and is particularly concerned with recovery of phthalic anhydride values from residues obtained in the purification of phthalic anhydride by distillation.

The conventional purification of crude phthalic anhydride produced by catalytic vapor phase air oxidation of naphthalene or other organic compounds involves at least one and frequently several distillation steps. The distillation may be applied to the crude phthalic anhydride without previous treatment or it may be applied to a phthalic anhydride which has been subjected to a heat treatment to convert volatile impurities into less volatile products. In some cases condensing agents, such as sulfuric acid or acid salts, may be added to accelerate such conversion. In the process of Cooper United States patent application Serial No. 330,954, filed April 22, 1940, a process is described in which a sulfuric acid treatment is followed by an alkaline treatment and the product of these treatments is distilled.

By all of the above procedures a tarry distillation residue is obtained from the phthalic anhydride stock. This tarry residue contains considerable quantities of phthalic anhydride. The proportion of phthalic anhydride is usually dependent upon the purity of the phthalic anhydride product that is being produced; thus, if a product of low grade is being produced, distillation may be carried to a point at which the phthalic anhydride content of the residue is small. Since, however, phthalic anhydride distillation is no exception to the normal rule that the further the distillation is carried the greater the proportion of high-boiling impurities carried along with the product, it is necessary to terminate the distillation earlier where products of high purity are being recovered as distillate. Residues resulting from distillation to produce a semi-refined phthalic anhydride may contain on the order of 40% or 50% of phthalic anhydride, whereas residues resulting from a distillation to produce a highly refined product may contain as much as 90% or 95% of phthalic anhydride. The other constituents of the residue are mainly tarry carbonaceous constituents of little commercial value and normally they are not considered sufficiently valuable to warrant recovery. Phthalic anhydride residues resulting from distillation of phthalic anhydride which has been treated with non-volatile condensing agents, such as acid salts and alkalies, and products obtained by the Cooper process above referred to contain, in addition to tarry impurities, metallic salts of organic or inorganic acids.

The phthalic anhydride may be recovered from phthalic anhydride still residues by distillation but the residue of such a distillation is normally a pitch or coke which is similar in character to coal tar distillation residues and equally difficult to remove from the coking chamber. Moreover the phthalic anhydride obtained by such a distillation is of extremely low grade because of the relatively large content of higher-boiling impurities which are volatile at the temperature required for the distillation.

It has been proposed to cool liquid phthalic anhydride still residues in order to solidify them and then to grind the residues and leach the ground residues with water to convert phthalic anhydride values to phthalic acid solution, from which phthalic acid can be recovered in conventional manner. Such a procedure is open to several objections. First, much time and equipment are required for properly cooling and solidifying the residue. Second, grinding of the solidified residue is an important step in the process and an expensive operation from the standpoints of both power requirements and apparatus. Third, the leaching process proceeds very slowly; in fact, it proceeds so slowly that it has been proposed to employ an alkali to accelerate the reaction. However, the alkaline leaching demands a subsequent neutralization so that both alkali and acid are expended in the process. Finally, the presence of neutralization products imposes further restrictions upon recovery of phthalic acid from the resulting solution.

The present invention has for its objects the hydration of phthalic anhydride or the recovery of phthalic anhydride values from phthalic anhydride distillation residue by a simple process which does not require expensive equipment and which is easy and inexpensive to operate.

In accordance with the present invention, phthalic anhydride is run in molten condition into water. By introducing the hot molten anhydride directly into water, I have found that the insoluble anhydride is rapidly hydrated to form soluble phthalic acid which promptly dissolves in the water.

The molten phthalic anhydride distillation residue may be at a temperature as low as 130° C. or as high as 250° C. and may be run into water at a temperature from as low as 70° C. up to the boiling point of water, or if a solute such as phthalic acid is present in the water, up to the boiling point of the solution. The weight ratio of water to be used to phthalic anhydride in the residue may vary from 2 to 40. When the proportion of water used is insufficient to hydrate and dissolve all of the anhydride, a phthalic acid slurry is formed; additional water may be added to this slurry to dissolve the suspended phthalic acid.

In its preferred form the invention involves introduction of the molten anhydride while at a temperature between 200° C. and 235° C. directly into water maintained at a temperature of at least 90° C. the quantity of water employed being by weight between 6 times and 20 times the weight of phthalic anhydride. By conducting the process in this manner local formation of steam is caused at anhydride particle surfaces and a violent disintegration of relatively large particles into small porous, granular particles occurs, and the hydration and solution of the phthalic anhydride are almost instantaneous. Insoluble impurities present in phthalic anhydride distillation residues are converted to a granular product which may be separated readily from the solution by settling and decanting, by filtering, or by centrifuging.

Phthalic acid may be recovered from the aqueous solution produced in my process by cooling the solution to crystallize out the phthalic acid or by evaporating water from the solution. If the process is operated in conjunction with a phthalic anhydride recovery method such as described in United States Patent 2,071,357, the solution of phthalic acid may be used to advantage as make-up liquor for supplying the direct contact vapor cooler. Since the liquor in the vapor cooler is concentrated by reaction of water with phthalic anhydride vapor from the converter, no separate treatment of the liquor is necessary for recovering the phthalic acid which it contains.

In the treatment of phthalic anhydride distillation residues containing metal salts, the molten residue may be filtered to remove such salts prior to effecting the hydration of the present invention. Alternatively such distillation residues may be first hydrated by the process of the invention and phthalic acid may be fractionally crystallized from the resulting solution so as to leave metal salts dissolved in the mother liquor.

The following examples illustrate the practical application of the invention.

Example 1

A crude phthalic anhydride vacuum still residue (melting point about 121° C.) containing about 60% by weight of phthalic anhydride and the balance high-boiling and tarry impurities is caused to flow while yet at a temperature of about 235° C. into a violently agitated stream of water at a temperature of 95° C. in a ratio of about 1.2 pounds of phthalic anhydride (2 pounds of residue) per gallon of water. The resulting mixture is led into a settling tank and the carbonaceous mud is allowed to settle. It is desirable that the tank be sufficiently insulated to avoid cooling to below about 80° C. Phthalic acid solution is decanted off and conducted as make-up water to the direct contact vapor cooler of a phthalic acid recovery system, wherein it reacts with phthalic anhydride, and solid phthalic acid is then separated from the slurry. The mud in the settling tank or an accumulation of muds from several such settling steps and decantations may be mixed with additional hot water in a ratio of about 1¼ gallons of additional water for each pound of solids, and allowed to settle; the aqueous solution may be passed to the main direct contact vapor cooler. The remaining mud may be discharged to the sewer or otherwise disposed of.

Example 2

A phthalic anhydride still residue comprising about 80% phthalic anhydride and about 12% of sodium salts (sodium sulfate, sodium carbonate, and sodium phthalate) while at a temperature of about 200° C. is mixed with about 3% of its weight of "Filter Cel" and filtered through a 20 x 250 mesh, 0.011 x 0.0084 inch wire, "Monel" metal cloth basket. Filtrate is recirculated at first to build up a "Filter Cel" bed on the cloth in conventional manner. This filtration step removes approximately 99% of the sodium salts present in the residue. The filtered residue is then treated as in Example 1.

Example 3

A molten phthalic anhydride residue of the type employed in Example 1 is caused to flow at a temperature of 235° C. gradually into an agitated body of water maintained at a temperature of about 100° C. until a quantity of residue about one-fourth the weight of the water has been added. Agitation is continued for about 15 minutes. The resulting slurry is then cooled to about 80° C. and centrifuged to separate solids. The solution is evaporated to dryness. A crude phthalic acid product is produced which may be dehydrated to form crude phthalic anhydride and refined in conventional manner.

Example 4

A crude phthalic anhydride distillation residue of the type employed in Example 2 and at a temperature of about 235° C. is run directly, without separation of metal salts, into a well-agitated body of water maintained at a temperature of about 100° C. until the ratio of still residue to water is about 1:9 by weight. The resulting slurry is centrifuged to separate solids. The resulting liquid, still at a temperature above 80° C., is then cooled to about 25° C. to crystallize phthalic acid. The mixture of phthalic acid crystals and mother liquor is centrifuged to separate phthalic acid crystals from mother liquor. A good quality of phthalic acid is thus obtained. The purity of the phthalic acid product may be controlled by regulating the quantity of water used for the dehydration and the temperature to which the solution is cooled to crystallize phthalic acid. Since the loss of phthalic acid in mother liquor increases with regulation of these conditions to increase the purity of the phthalic acid product, a balancing of these two factors is involved. Normally it may be desirable to recover a product of lower grade in order to reduce the quantity of phthalic acid present in the mother liquor and to subject the phthalic acid product to further purification either by crystallization or by dehydration and distillation. Mother liquor may be disposed of in any suitable manner.

Example 5

A crude phthalic anhydride distillation residue of the type employed in Example 2 and yet at a temperature of about 235° C. is filtered as described in Example 2. The filtered product is then vacuum distilled to a phthalic anhydride content of about 60% by weight and is caused to flow while yet at a temperature of 235° C. into a mixing chamber where it is commingled with a turbulent stream of water entering the mixing chamber at a temperature between 95° and 100° C. The ratio of water and residue flowing to the mixing chamber is regulated to provide about 1.2 pounds of phthalic anhydride per gallon of water. The resulting mixture is passed to a drum filter and filtered while the temperature is above 80° C. to separate undissolved impurities. The phthalic acid filtrate is cooled to a temperature between about 50° and 60° C. and the resulting slurry of phthalic acid is brought into direct contact with hot reaction gases and vapors from a phthalic anhydride converter to separate phthalic anhydride vapors from the gases and convert the phthalic anhydride to phthalic acid.

I claim:

1. In the recovery of phthalic anhydride values from phthalic anhydride distillation residue containing phthalic anhydride and higher boiling water-insoluble constituents, the improvement which comprises introducing into a body of water having a temperature of at least 70° C. said phthalic anhydride distillation residue in molten condition at a temperature of at least 130° C. at which steam forms at the surfaces of the molten residue and the residue is disintegrated with substantially immediate hydration and solution in said water of the phthalic anhydride and formation of small, porous, granular particles of said water-insoluble constituents, and mechanically separating the resulting phthalic acid solution from said particles of water-insoluble constituents.

2. In the recovery of phthalic anhydride values from phthalic anhydride distillation residue, the improvement which comprises introducing the phthalic anhydride distillation residue in molten condition and at a temperature between 200° C. and 235° C. into water at a temperature of at least 90° C. and mechanically separated undissolved material from the resultant phthalic acid solution.

3. In the recovery of phthalic anhydride values from phthalic anhydride distillation residue, the improvement which comprises mixing the phthalic anhydride distillation residue in molten condition and at a temperature between 200° C. and 235° C. with water maintained at a temperature of at least 90° C. in amount corresponding to between 6 times and 20 times the weight of phthalic anhydride present in the residue and mechanically separating undissolved material from the resulting phthalic acid solution.

4. In the recovery of phthalic anhydride values from phthalic anhydride distillation residue, the improvement which comprises mixing the phthalic anhydride distillation residue in molten condition and at a temperature between 200° C. and 235° C. with water at a temperature of at least 90° C. in amount corresponding to between 6 times and 20 times the weight of phthalic anhydride present in the residue, mechanically separating undissolved material from the resulting phthalic acid sollution, cooling the separated phthalic acid solution to crystallize out phthalic acid, and separating the crystallized phthalic acid from mother liquor.

5. In the recovery of phthalic anhydride values from phthalic anhydride distillation residue, the improvement which comprises mixing the phthalic anhydride distillation residue in molten condition and at a temperature between 200° C. and 235° C. with water at a temperature of at least 90° C. in amount corresponding to between 6 times and 20 times the weight of phthalic anhydride present in the residue, mechanically separating undissolved material from the resulting phthalic acid solution, and evaporating off water to precipitate phthalic acid.

6. In the recovery of phthalic anhydride values from phthalic anhydride distillation residue, the improvement which comprises mixing the phthalic anhydride distillation residue in molten condition and at a temperature between 200° C. and 235° C. with water at a temperature of at least 90° C. in amount corresponding to between 6 times and 20 times the weight of phthalic anhydride present in the residue, mechanically separating undissolved material from the resulting phthalic acid solution, and bringing the resulting aqueous phthalic acid into direct contact with reaction gases and vapors resulting from catalytic vapor phase production of phthalic anhydride so as to recover phthalic anhydride therefrom in the form of phthalic acid.

7. In the recovery of phthalic anhydride values from phthalic anhydride distillation residue containing metal salts and tarry impurities, the improvement which comprises filtering the residue in molten condition to separate metallic salts, mixing the filtered molten residue while at a temperature of at least 130° C. with water at a temperature of at least 70° C. in amount corresponding to between 2 times and 40 times the weight of phthalic anhydride present in the residue, and mechanically separating undissolved material from the resulting phthalic acid solution.

8. In the recovery of phthalic anhydride values from phthalic anhydride distillation residue containing metal salts and tarry impurities, the improvement which comprises filtering the residue in molten condition to separate metallic salts, mixing the filtered molten residue while at a temperature between 200° C. and 235° C. with water at a temperature of at least 90° C. in an amount corresponding to between 6 times and 20 times the weight of the phthalic anhydride present in the residue, and mechanically separating undissolved material from the resulting phthalic acid solution.

9. In the recovery of phthalic anhydride values from phthalic anhydride distillation residue containing metal salts and tarry impurities, the improvement which comprises mixing the phthalic anhydride distillation residue while yet in molten condition and at a temperature between 200° C. and 235° C. with water at a temperature of at least 90° C. and in amount corresponding to between 6 times and 20 times the weight of phthalic anhydride present in the residue, mechanically separating undissolved material from the resulting phthalic acid solution, cooling the separated phthalic acid solution to crystallize out phthalic acid while retaining metallic salts in solution, and separating the crystallized phthalic acid from mother liquor.

10. In the recovery of phthalic anhydride values from phthalic anhydride distillation residue containing metal salts and tarry impurities, the improvement which comprises filtering the residue in molten condition to separate metallic salts, mixing the filtered molten residue while at a temperature between 200° C. and 235° C. with water at a temperature of at least 90° C. in amount corresponding to between 6 times and 20 times the weight of phthalic anhydride present in the residue, mechanically separating undissolved material from the resulting phthalic acid solution, and bringing the resulting aqueous phthalic acid into direct contact with reaction gases and vapors resulting from catalytic vapor phase production of phthalic anhydride so as to recover phthalic anhydride therefrom in the form of phthalic acid.

EDWIN AUSTIN GASKILL, Jr.